(12) United States Patent
VanLoo et al.

(10) Patent No.: US 11,563,778 B1
(45) Date of Patent: Jan. 24, 2023

(54) NETWORK PRIVACY POLICY SCORING

(71) Applicant: Identity Theft Guard Solutions, Inc., Portland, OR (US)

(72) Inventors: Brent VanLoo, Forest Grove, OR (US); Christopher Semke, Portland, OR (US); Doug Pollack, Portland, OR (US)

(73) Assignee: IDENTITY THEFT GUARD SOLUTIONS, INC., Portland, OR (US)

( * ) Notice: Subject to any disclaimer, the term of this patent is extended or adjusted under 35 U.S.C. 154(b) by 135 days.

(21) Appl. No.: 17/071,313

(22) Filed: Oct. 15, 2020

(51) Int. Cl.
*H04L 9/40* (2022.01)

(52) U.S. Cl.
CPC .................................... *H04L 63/20* (2013.01)

(58) Field of Classification Search
CPC ...................................................... H04L 63/20
USPC .............................................................. 726/1
See application file for complete search history.

(56) References Cited

U.S. PATENT DOCUMENTS

| | | | | |
|---|---|---|---|---|
| 10,747,897 B2 * | 8/2020 | Cook | | H04L 63/1483 |
| 2011/0185436 A1 * | 7/2011 | Koulinitch | | H04L 63/10 |
| | | | | 726/28 |
| 2016/0164915 A1 * | 6/2016 | Cook | | H04L 63/04 |
| | | | | 726/1 |
| 2016/0323321 A1 * | 11/2016 | Cheng | | H04W 12/06 |
| 2020/0302122 A1 * | 9/2020 | Lai | | G06F 16/28 |
| 2020/0349280 A1 * | 11/2020 | Cook | | G06F 21/6245 |
| 2021/0004637 A1 * | 1/2021 | Asaf | | G06V 10/758 |
| 2021/0089620 A1 * | 3/2021 | Finkelshtein | | G10L 15/19 |

* cited by examiner

*Primary Examiner* — Kambiz Zand
*Assistant Examiner* — Aubrey H Wyszynski
(74) *Attorney, Agent, or Firm* — Schwegman Lundberg & Woessner, P.A.

(57) ABSTRACT

A user of a client device accesses a service provided by a server computer. The server computer gathers data about the user. The data gathered may be kept private by the server computer, shared only with other computers and users owned by the same entity, shared with selected third parties, or made public. The server computer provides a privacy policy document that describes how the data gathered is used. A privacy server analyzes the privacy policy document and, based on the analysis, generates a privacy score. The privacy score or an informational message selected based on the privacy score are provided to the client device. In response, the client device presents the privacy score or the informational message to the user. In this way, the user is informed of privacy risks that result from accessing the server computer.

19 Claims, 8 Drawing Sheets

410 — USER TABLE

| USER ID | NAME | SOCIAL NETWORK SETTINGS | VPN |
|---|---|---|---|
| 1234 | ADAM SMITH | ALL PUBLIC | NO |
| 2344 | JOHN JAY | FRIENDS ONLY, 24 FRIENDS | YES |
| 3446 | JAMES WILSON | FRIENDS ONLY, 1000 FRIENDS | NO |

440 — SITE TABLE

| SITE ID | URL | PRIVACY POLICY |
|---|---|---|
| 4467 | HTTPS://FOO.COM | YOU AGREE TO ALLOW ... |
| 4678 | HTTPS://BAR.COM | BAR.COM MAY SELL YOUR ... |
| 6789 | HTTPS://SCHOOL.EDU | SCHOOL.EDU PROMISES ... |

470 — SCORE TABLE

| SITE ID | PROTECTION | OWNERSHIP | USE | DISCLOSURE |
|---|---|---|---|---|
| 4467 | 40 | 60 | 70 | 80 |
| 4678 | 40 | 20 | 20 | 20 |
| 6789 | 90 | 0 | 0 | 40 |

NETWORK PRIVACY POLICY SCORING

TECHNICAL FIELD

The subject matter disclosed herein generally relates to computerized methods and systems for processing data. Specifically, in some example embodiments, the present disclosure addresses systems and methods for evaluating privacy policies.

BRIEF DESCRIPTION OF THE DRAWINGS

Some embodiments are illustrated by way of example and not limitation in the figures of the accompanying drawings.

DETAILED DESCRIPTION

Example methods and systems are directed to network privacy policy scoring. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user of a client device accesses a service provided by a server computer over a network. The server computer gathers data about the user, the client device, the network connection, or any suitable combination thereof. The data gathered may be kept private by the server computer, shared only with other computers and users owned by the same entity (e.g., kept within a particular company), shared with selected third parties, made public, or any suitable combination thereof. The server computer provides a privacy policy document that describes how the data gathered is used.

A privacy server analyzes the privacy policy document and, based on the analysis, generates a privacy score. The privacy score, an informational message selected based on the privacy score, or both are provided to the client device. In response, the client device presents the privacy score, the informational message, or both to the user. In this way, the user is informed of privacy risks that result from accessing the server computer.

In some example embodiments, the informational message provides one or more options to change user settings that impact privacy or activate a service that affects the data provided to the server computer. Thus, by use of systems and methods described herein, users are enabled to better monitor how their data is used online and to better control the distribution of that data.

Figure 1:
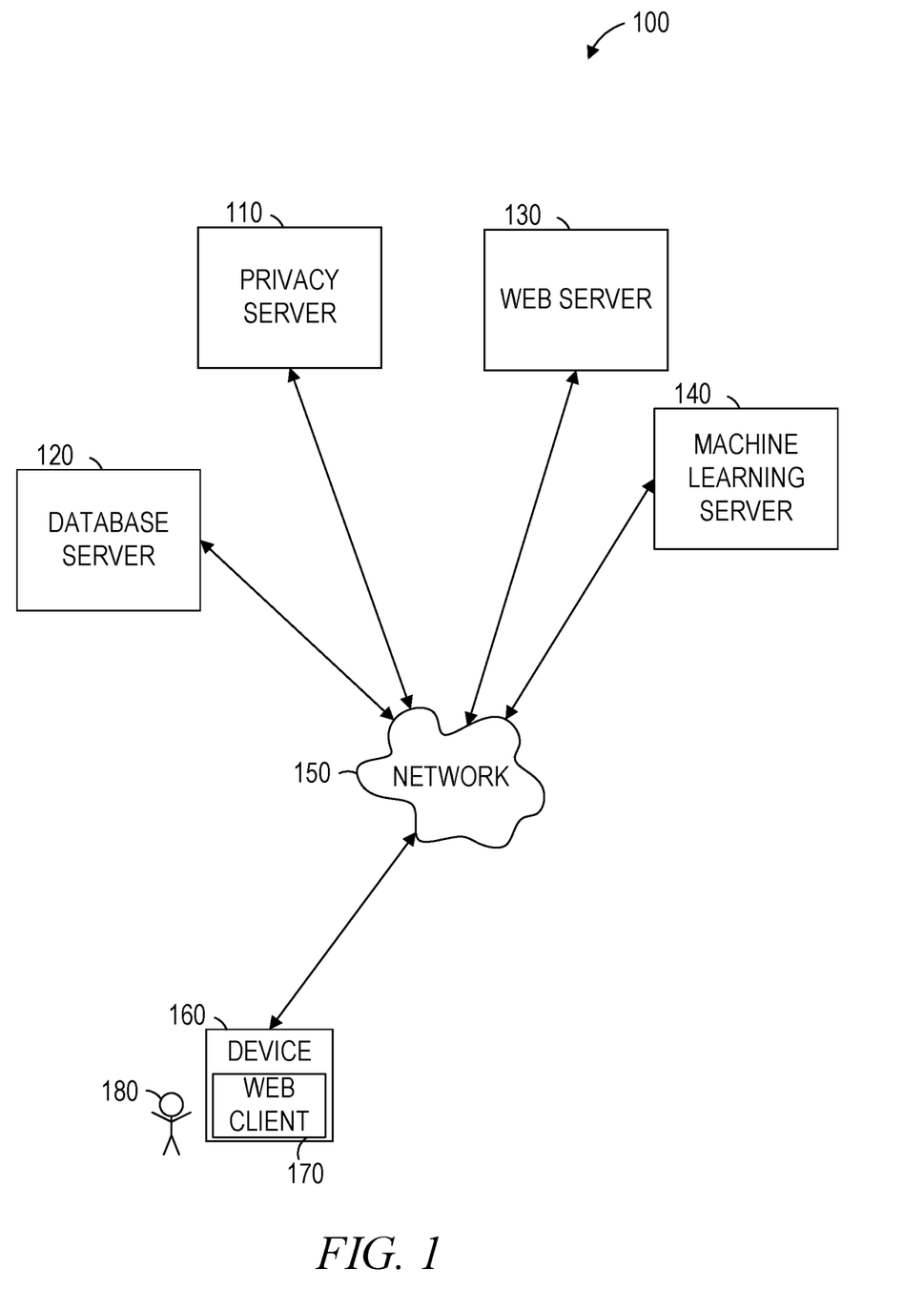
FIG. 1 is a network diagram illustrating a network environment suitable for network privacy policy scoring, according to some example embodiments.

FIG. 1 is a network diagram illustrating a network environment 100 suitable for network privacy policy scoring, according to some example embodiments. The network environment 100 includes a privacy server 110, a database server 120, a web server 130, a machine learning server 140, and a client device 160, all communicatively coupled to each other via a network 150. The privacy server 110, the database server 120, the web server 130, and the machine learning server 140 are network-based systems. The client device 160 may interact with the servers 110-140 using a web client 170. The servers 110-140 and the client device 160 may each be implemented in a computer system, in whole or in part, as described below with respect to FIGS. 7-8.

The privacy server 110 collects or accesses data regarding the web server 130. Based on the data collected, it generates a privacy policy score for the web server 130. The privacy policy score may be based on terms and conditions of a privacy policy of the web server 130, observed behavior of the web server 130, or both.

Database services are provided by the database server 120 to the privacy server 110. The database services provided by the database server 120 include data storage and retrieval.

The web server 130 provides web-based services (e.g., social network services, news services, application services, medical services, or any suitable combination thereof) to multiple users. A privacy policy associated with the web server 130 describes the manner in which the web server 130 uses data regarding the user 180, the client device 160, the web client 170, or any suitable combination thereof.

Social networks are designed to facilitate communications between users, but also to gather information about users to support targeted advertising. As a result, users often are unaware of the amount of data that is being shared with advertising partners or the public at large. The advertising may be generated directly by the web service or by a third-party advertising server. Even services that do not require a log-in may collect data regarding a user based on the Internet protocol (IP) address of the client device 160 being used to connect to the web server 130 or based on cookies stored on the client device 160 by the web server 130 or another web server. For example, a first advertisement provided by an advertising server may be associated with a cookie containing a unique identifier for the client device 160. When the web client 170 loads another web page from another web server, the cookie may be accessed, allowing any known data regarding the user 180, the client device 160, or the web client 170 to be associated with the current session. Thus, even when a user provides little information directly to a particular web server 130, the web server 130 may be able to access a substantial amount of information about the user.

The machine learning server 140 uses machine learning techniques to train one or more models. Training the model is done using a training set of labeled data, with each member of the training set associating an example input with a known output. Once trained, the model generates a predicted output for new inputs. For example, a model may be trained to determine whether a privacy policy allows for sharing data with third parties. The training set comprises a number of example privacy policies (e.g., 1,000 privacy policies), each of which has been labeled as either True (data is shared) or False (data is not shared). After training, the machine learning model is given a privacy policy as input and generates a True or False result to indicate whether the input privacy policy shares data with third parties or not. A different machine learning model may be generated for each aspect of privacy policies to be evaluated. Alternatively, a single machine learning model may be trained that generates a vector as an output, with each element in the vector indicating a particular fact about the input privacy policy.

Also shown in FIG. 1 is a user 180. The user 180 may be a human user (e.g., a human being), a machine user (e.g., a computer configured by a software program to interact with the client device 160 and one or more of the servers 110-140), or any suitable combination thereof (e.g., a human assisted by a machine or a machine supervised by a human). The user 180 is not part of the network environment 100, but is associated with the client device 160 and may be a user of the client device 160 (e.g., an owner of the client device 160). For example, the client device 160 may be a desktop computer, a vehicle computer, a tablet computer, a navigational device, a portable media device, or a smart phone belonging to the user 180. In some example embodiments, a user of a first client device 160 is an employee and a user of a second client device 160 is a student.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 7-8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 150 may be any network that enables communication between or among machines, databases, and devices (e.g., the privacy server 110 and the client device 160). Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
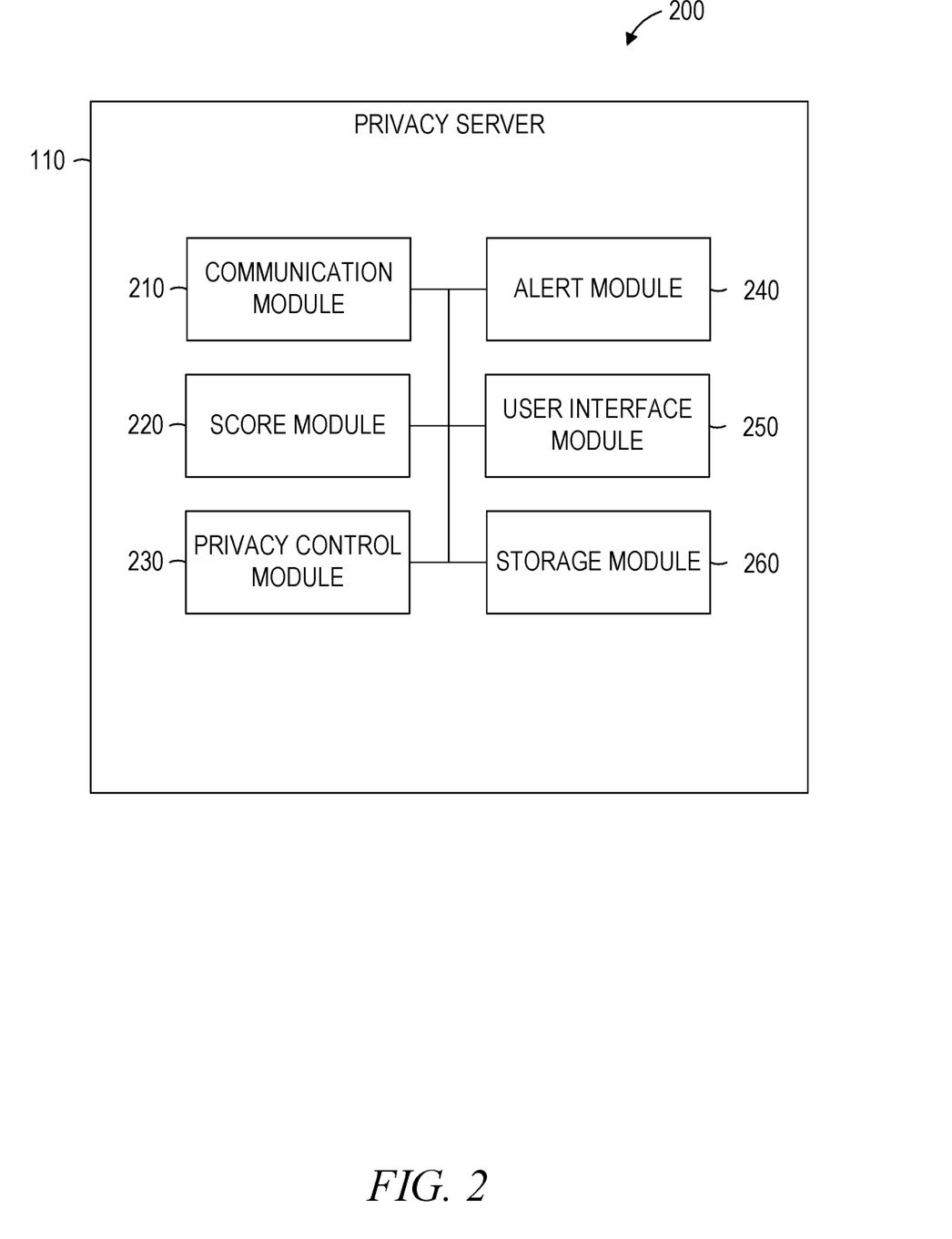
FIG. 2 is an architectural diagram illustrating components of a privacy server in communication with other systems, according to some example embodiments.

FIG. 2 is an architectural diagram 200 illustrating components of a privacy server 110 in communication with other systems, according to some example embodiments. The privacy server 110 includes a communication module 210, a score module 220, a privacy control module 230, an alert module 240, a user interface module 250, and a storage module 260, all configured to communicate with each other (e.g., via a bus, shared memory, a switch, or APIs). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive from the client device 160, over the network 150, a notification that the client device 160 is accessing the web server 130, a request to provide a privacy policy score for the web server 130, or both. The communication module 210 may communicate the request or the notification to the score module 220 to generate a privacy policy score, transmit a user interface provided by the user interface module 250 to the client device 160, and receive user selections of options in the user interface for processing by the privacy control module, storage by the storage module 260, or any suitable combination thereof.

The score module 220 is configured to generate a privacy policy score for a server. For example, score components may be generated based on text of a server's privacy policy, the server's past behavior, security settings, commercial arrangements, or responsiveness to privacy requests, among others. Based on one or more of the score components, a privacy policy score is generated for the server.

The privacy control module 230 enables or disables privacy services. For example, in response to a low privacy policy score generated by the score module 220, transmitted to the client device 160 by the communication module 210, and presented on a display of the client device 160, the user may choose to enable a privacy service. In response to the enabling of the privacy service, the privacy control module 230 performs one or more operations to improve the privacy of the user. For example, anonymized web browsing may be enabled, so that the user's browser data is redirected through the privacy server 110, preventing an accessed server (e.g., the web server 130) from accessing the actual internet protocol (IP) address of the client device 160.

The alert module 240 is configured to generate alerts. The generated alerts may be provided to users or service providers (e.g., to report privacy policy score changes), or any suitable combination thereof. Each alert may be in the form of e-mail, text message, automated voice message, push notification, pop-up window, or another suitable method of notification.

The user interface module 250 serves a website, via a hypertext transfer protocol (HTTP) connection, to the client device 160. The user interface may include information regarding a privacy score, a privacy service, or any suitable combination thereof. For example, the user interface 300, described below with respect to FIG. 3, may be presented by the user interface module 250, and selections may be received via an application interface or a web interface. The storage module 260 is configured to store data regarding users, entities, devices, servers, networks, or any suitable combination thereof.

In some example embodiments, the database server 120 or the privacy server 110 uses Structured Query Language (SQL) to access standard relational database and NoSQL to access databases other than standard relational databases. Dynamo NoSQL is a particular type of NoSQL based on key-value pairs. For example, a database may store usernames, passwords, authentication questions, user profiles, a user's name, social security number, birthdate, address, previous addresses, phone number, bank account numbers, browsing history, network configuration, software configuration, or any suitable combination thereof.

Figure 3:
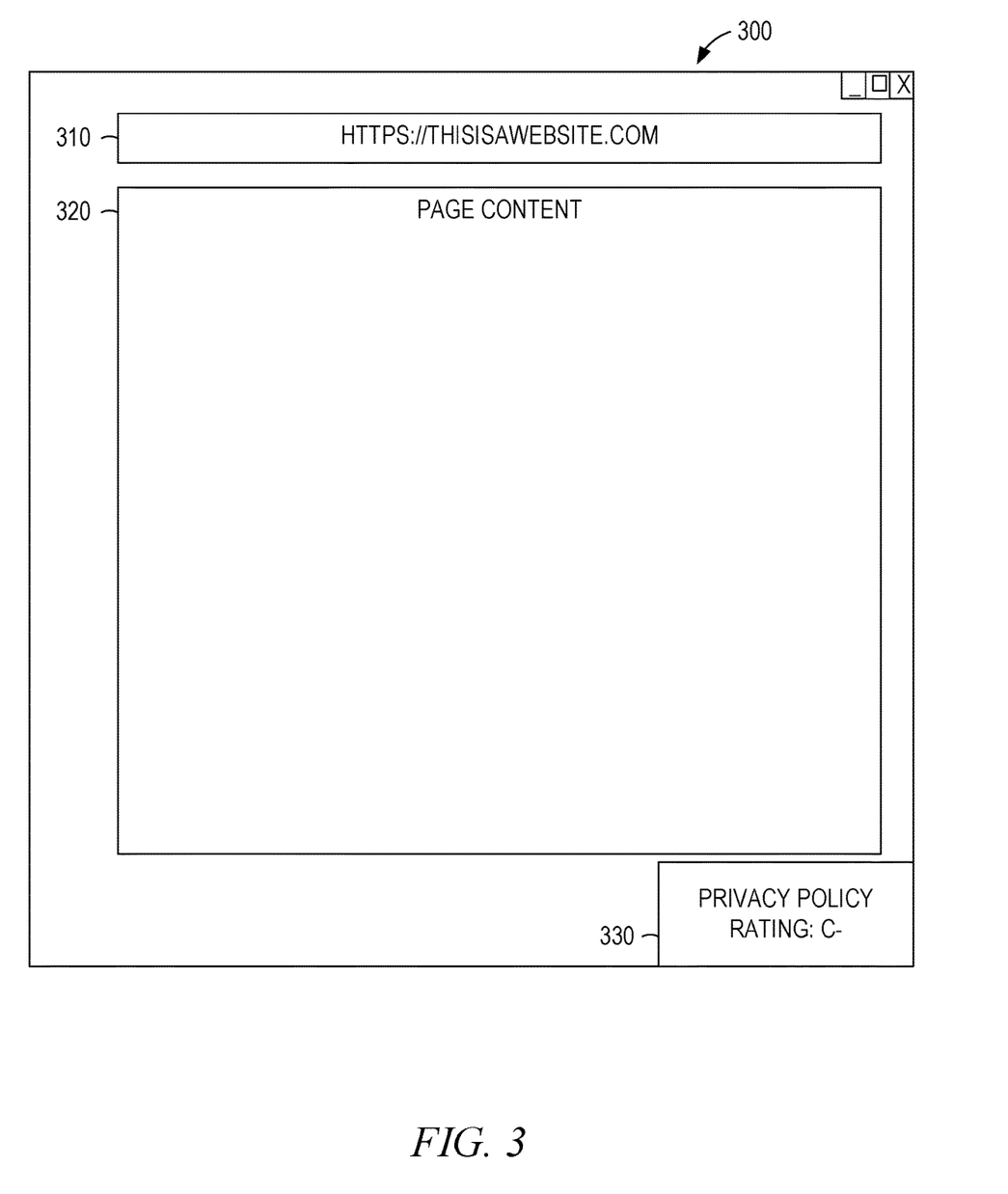
FIG. 3 is a block diagram illustrating a user interface for displaying a web page with a network privacy policy scoring result for the web page, according to some example embodiments.

FIG. 3 is a block diagram illustrating a user interface 300 for displaying a web page with a network privacy policy scoring result for the web page, according to some example embodiments. As can be seen in FIG. 3, the user interface 300 includes a uniform resource locator (URL) 310, page content 320, and privacy policy information 330. The URL 310 identifies the web page being displayed. The page content 320 is provided by the web site and rendered by a web browser running on a client device (e.g., the web client 170 executing on one or more processors of the client device 160). The privacy policy information 330 includes a privacy policy score, a recommendation, or both. The privacy policy score may be generated based on data about the web page, text of a privacy policy associated with the web server, past behavior of the web server, or any suitable combination thereof. The recommendation may be generated based on the privacy score, security products or services to which the user already has access (e.g., as indicated by account data of an account of the user), security products or services to which the user may seek access (e.g., by paying a fee, by allowing increased data monitoring, by allowing use of computing resources of the client device, or any suitable combination thereof), or any suitable combination thereof.

In the example of FIG. 3, the site's privacy policy is indicated as a C- (e.g., on an A-F scale corresponding to school letter grades, with A indicating high privacy protections and F indicating low or no privacy protections). Numeric scores may be converted to letter scores based on predetermined thresholds or ranges (e.g., A=90-100, B=80-89, C=70-79, D=60-69, F=0-59). In some example embodiments, interacting with the privacy policy information 330 (e.g., by clicking or touching an area of the user interface 300 in which the privacy policy information 330 is displayed) causes presentation of another user interface that presents more detailed information regarding the privacy policy, options to improve privacy, or both. Thus, by addition of the privacy policy information 330 to the user interface 300, the user is informed of privacy risk resulting from accessing the URL 310 and enabled to take action to reduce the privacy risk. By comparison with prior art systems not displaying the privacy policy information 330, the user's awareness of privacy risks is improved and the probability of taking privacy-enhancing action is increased. The improved privacy for the user's data results in the user having greater control of the data.

The privacy policy information 330 may be presented using a color code. For example, a privacy policy score below a first predetermined reference may cause at least a portion of the privacy policy information 330 to be presented in red; a privacy score above the first predetermined reference and below a second predetermined reference may cause at least a portion of the privacy policy information 330 to be presented in yellow; and a privacy score above the second predetermined reference may cause at least a portion of the privacy policy information 330 to be presented in green.

In some example embodiments, the privacy policy information 330 is selectively presented based on the privacy policy score and a predetermined reference. For example, if the privacy score is above the predetermined reference, the privacy policy information 330 may not be presented or a reduced-size color coded version of the privacy policy information 330 may be presented. Continuing with this example, if the privacy policy score is below the predetermined reference, the privacy policy information 330 may be presented in a larger size to attract the user's attention. Thus, as the web browser is navigated from one site to another, the privacy policy information 330 may be presented and removed based on the privacy policy score determined at each site.

Figure 4:
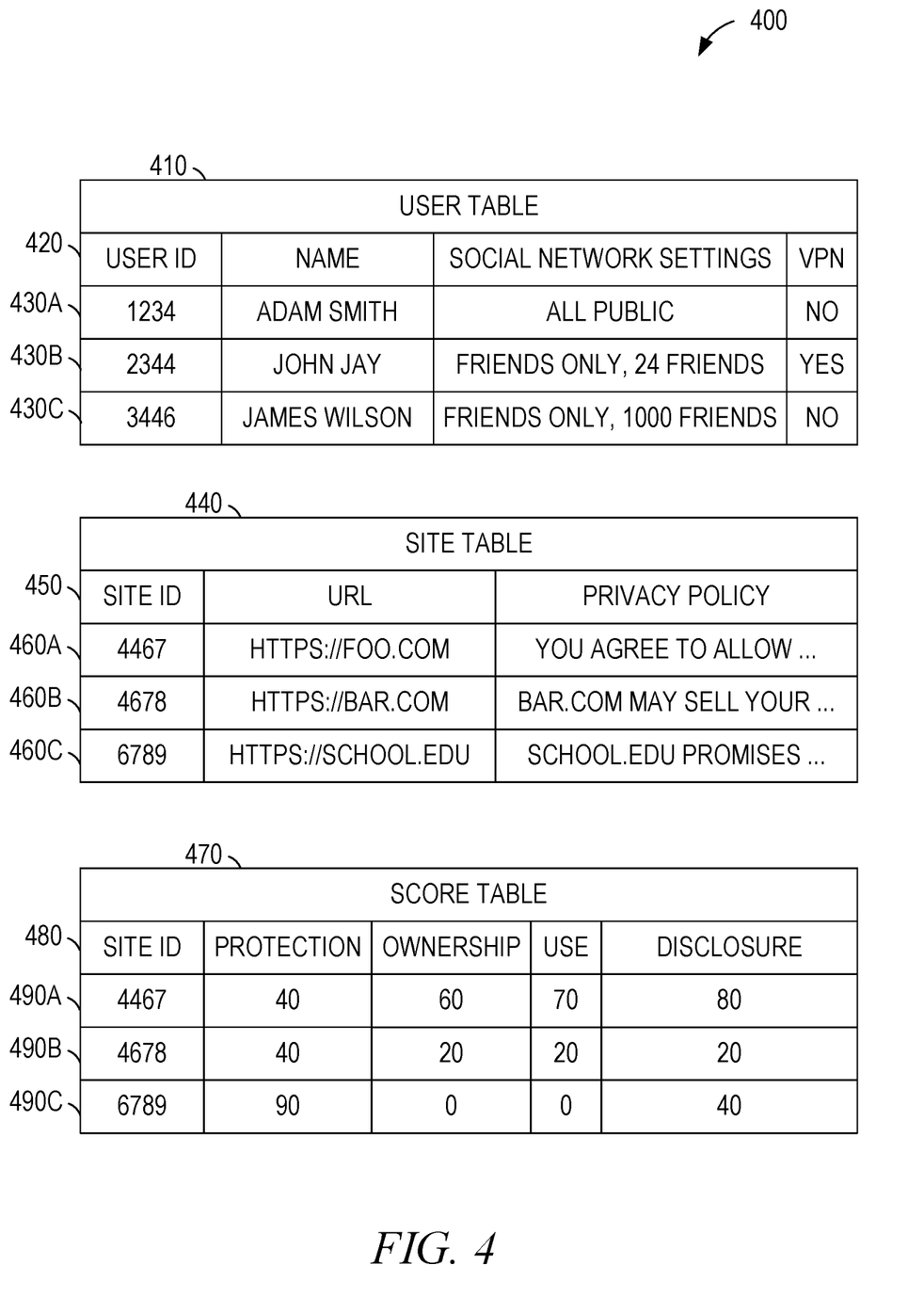
FIG. 4 is a block diagram illustrating a database schema suitable for supporting network privacy policy scoring, according to some example embodiments.

FIG. 4 is a block diagram illustrating a database schema 400 suitable for supporting network privacy policy scoring, according to some example embodiments. The database schema 400 includes a user table 410, a site table 440, and a score table 470. The user table 410 is defined by a table definition 420, including a user identifier field, a name field, a social network settings field, and a VPN field. The user table 410 includes rows 430A, 430B, and 430C. The site table 440 is defined by a table definition 450, including a site identifier field, a URL field, and a privacy policy field, and includes rows 460A, 460B, and 460C. The score table 470 is defined by a table definition 480 and includes rows 490A, 490B, and 490C. The table definition 480 shows that each of the rows 490A-490C includes a site identifier field, a protection score field, an ownership score field, a use score field, and a disclosure score field.

As used herein, data protection refers to efforts taken to ensure that data received by an entity is accurate and disseminated by that entity only intentionally. For example, if the entity stores data in files that are both publicly accessible and publicly editable, data protection is virtually nil. If the files are publicly accessible but are read-only, the data is protected from manipulation, but privacy is not maintained. Files stored on a private server that is accessible via the Internet and uses older software with known vulnerabilities are less secure that files stored on a server with up-to-date software. Data stored in a device that is not accessible directly from the public Internet is more protected that data in a server that is Internet-connected, and so on.

Data ownership refers to the degree to which a user owns the data provided to an entity. For example, under Europe's General Data Protection Regulation (GDPR), individuals have (among other rights): a right to rectification, allowing them to correct errors in collected data; a right to erasure, requiring the entity to delete data about the individual upon request, in certain circumstances; and a right to data portability, requiring the entity to transfer data about the individual to another entity upon request, in certain circumstances. Thus, even though a GDPR-compliant entity retains ownership of data, the user has a degree of owner-like rights and control of the data. Accordingly, a predetermined data ownership score may be assigned to a web site based on a determination that the privacy policy indicates GDPR compliance. Additional terms in the privacy policy may give additional rights to the user to control data gathered, further increasing the data ownership score for the privacy policy.

A non-GDPR-compliant privacy policy does not necessarily provide any data ownership to the user, but a non-zero score may still be generated based on analysis of the text of the privacy policy. For example, some web sites retain control of all of a user's data, but allow a user to delete an account and promise to delete all user data when an account is deleted. Additional points in the data ownership category may be granted for more granular control of data deletion, control over data sharing (e.g., public, private, or, in a social-network context, friends-only), and the like.

The data disclosure privacy score component is highest if the web site agrees to use the user's data only internally and lowest if the web site retains the right to share the user's data entirely at its own discretion. Intermediate scores reflect the degree to which the web site agrees to limit data disclosure. For example, data disclosure may be limited to third parties that aid in a transaction between the user and the web site (e.g., the user's address is provided to a shipping company to ship a product ordered on the web site).

The data use privacy score component is lower if the web site retains the right to use gathered data as it sees fit and increases as the use of the data is restricted to only uses that benefit the user. For example, a merchant web site may request a user's address, e-mail address, and phone number. This information is needed by the merchant to satisfy an order by the user for a physical good. If the merchant agrees that the received data is used only for this purpose, the data use privacy score of the merchant web site is high. However, if the merchant retains the right to use the e-mail address for e-mail marketing, the data use privacy score is reduced. Likewise, if the merchant retains the right to rent or sell an address list including the user's information, the data use privacy score is reduced.

A data sale privacy policy score component may be created as a separate component or as part of the data disclosure or data use privacy score components. The data sale privacy policy score component refers specifically to the web site's right to sell data related to the user. The data sale privacy policy score component is highest if the web site agrees not to sell the user's data at all, and is lowest if the web site retains the right to sell the user's data at its discretion. Intermediate scores are possible if the user is allowed to opt-out of data sale either entirely (best) or partially.

A data retention privacy policy score component may be created as a separate component or as part of the data use privacy score component. Data retention refers to the web site's ability to retain the user's data. For example, a web site that agrees to delete data after a predetermined period of time has passed (e.g., six months) is providing greater data privacy than a web site that retains the data indefinitely. As another example, a web site that agrees to delete all data relating to a user when the user deletes his or her account is providing greater data privacy than a web site that retains the user data even after the account has been removed.

Each of the rows 430A-430C stores information for a user. The user identifier field stores a unique identifier for the user. The name field stores a name of the user. The social networks settings field stores information related to settings for one or more social networks that the user is a member of With reference to FIG. 4, Adam Smith has configured his social network accounts to make all of his information public; John Jay has configured his social network accounts to make information available only to friends, and he has 24 friends; James Wilson has also configured his social network accounts to make information available only to friends, but he has 1000 friends. The VPN field indicates if the user uses a VPN to connect to the internet. In some example embodiments, the VPN field indicates whether the current connection is via VPN, whether the user has indicated that a VPN is used (e.g., without programmatic verification), or both. In some example embodiments, the VPN field indicates a percentage of the user's connections that are made using a VPN. In various example embodiments, additional or different fields are stored in the user table 410. For example, a browser field, an operating system field, a patch level field, or any suitable combination thereof may be stored.

Each of the rows 460A-460C stores a privacy policy for a web site along with a unique site identifier for the web site, for more efficient cross-referencing between database tables. The text of the privacy policy may be provided to one or more trained machine learning models to generate one or more privacy policy scores for the web site.

The score table 470 stores one or more privacy policy scores for the web sites of the site table 440. Thus, the example of FIG. 4 shows that (with cross-reference to the site table 440 based on the common site identifier of rows in each table) HTTPS://FOO.COM has a data protection policy score of 40, a data ownership policy score of 60, a data use policy score of 70, and a data disclosure policy score of 80. The multiple privacy policy scores shown in the score table 470 may be averaged to generate an overall privacy policy score. In such example embodiments, the overall privacy score of HTTPS://FOO.COM is 62.5; HTTPS://BAR.COM's overall privacy score is 25; and HTTPS://SCHOOL.EDU's overall privacy score is 32.5.

Figure 5:
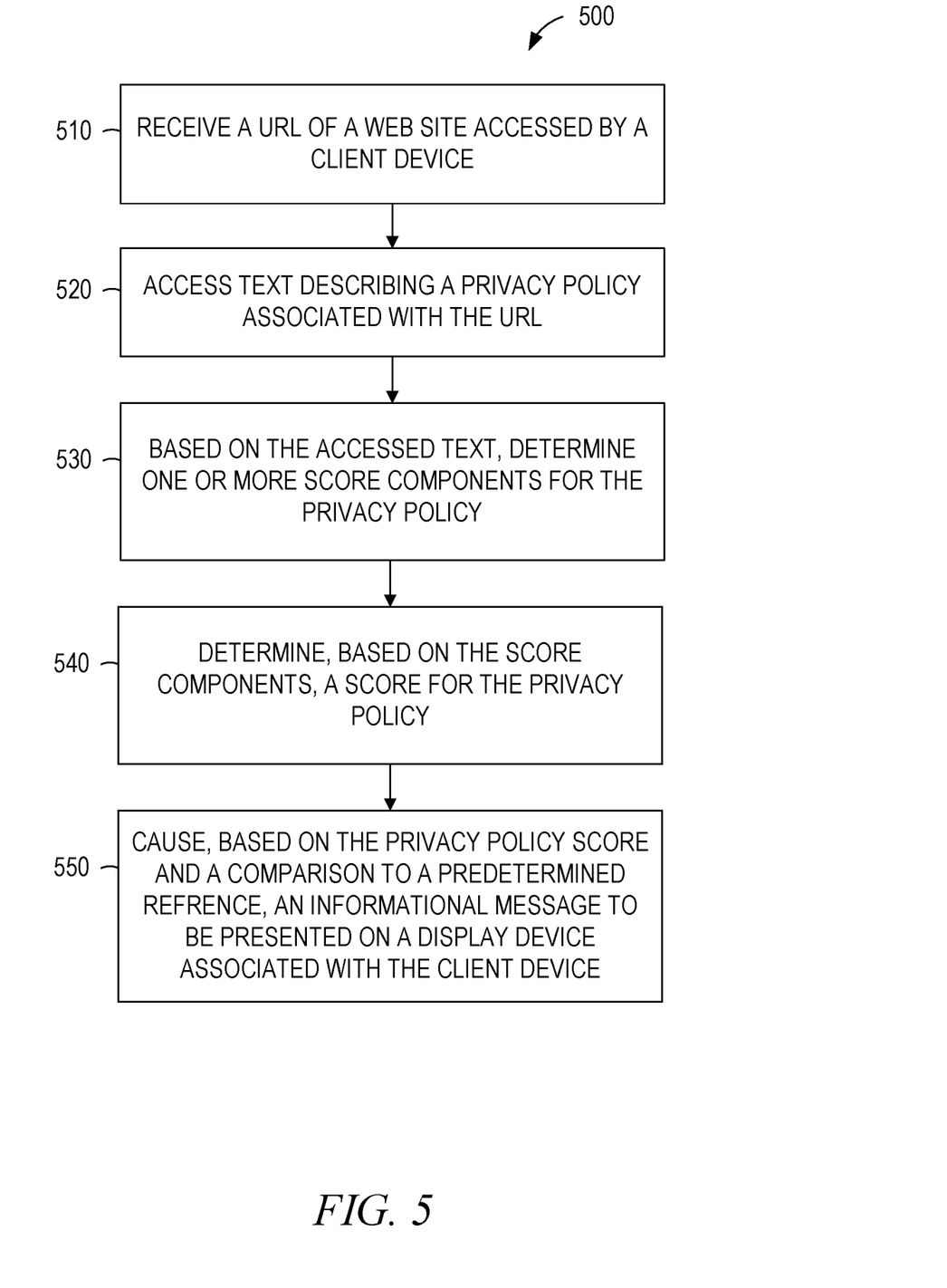
FIG. 5 is a flowchart illustrating operations of a computing device in performing a method of network privacy policy scoring, according to some example embodiments.

FIG. 5 is a flowchart illustrating operations of a computing device in performing a method 500 of network privacy policy scoring, according to some example embodiments. The method 500 includes operations 510, 520, 530, 540, and 550. By way of example and not limitation, operations in the method 500 are described as being performed by the privacy server 110, using modules described above with respect to FIG. 2.

In operation 510, the communication module 210 receives a URL of a web site accessed by a client device. For example, a plug-in of the web client 170 may send each URL accessed by the client device 160 to the privacy server 110. In some example embodiments, the plug-in provides a user interface component that indicates when network privacy policy scoring is active. The user interface component may allow the user to deactivate and reactivate network privacy policy scoring. When network privacy policy scoring is deactivated, the client device 160 does not send visited URLs to the privacy server 110 and the method 500 is not performed by the privacy server 110.

The score module 220, in operation 520, accesses text describing a privacy policy associated with the URL. For example, the domain of the URL may be extracted from the URL and used to find a row of the site table 440 and access a privacy policy stored in the row. As another example, a request for the privacy policy may be sent to the web server of the URL and the text of the privacy policy received in response.

In operation 530, the score module 220 determines, based on the accessed text, one or more score components for the privacy policy. For example, the text may be searched for pre-defined phrases and scored based on the presence or absence of those phrases. As another example, the text may be provided to one or more trained machine learning models to generate the one or more score components.

Based on the score components, the score module determines a score for the privacy policy (operation 540). For example, the score components may be averaged or the lowest score component may be used as the privacy policy score.

In operation 550, the alert module 240 causes, based on the privacy policy score and a comparison to a predetermined reference, an informational message to be presented on a display device associated with the client device. For example, the privacy policy information 330 of FIG. 3 may be sent to the browser plug-in running in the web client 170 on a monitor connected to the client device 160.

In an example embodiment, the predetermined reference is a numerical score (e.g., 60), such that any web site with at least the predetermined reference score does not have the privacy policy information displayed while web sites with lower privacy policy scores are displayed with the privacy policy information 330. In another example embodiment, the predetermined reference is a letter grade (e.g., B), such that any web site with at least the predetermined reference grade does not have the privacy policy information displayed while web sites with lower privacy policy scores are displayed with the privacy policy information 330.

In some example embodiments, the causing of the informational message to be displayed on the display device is further based on one of the score components and a second predetermined reference. For example, the privacy policy information 330 may be displayed if the data ownership score component is below a second predetermined reference even if the overall data policy privacy score is above the first predetermined reference. In this way, the user's attention is called to data privacy policies that are either bad overall or that are particularly bad in one particular aspect. For example, the data privacy policy may be called to the user's attention if the overall score is below 60% or if any component score is below 30% (e.g., a second predetermined reference that is less than the first predetermined reference).

Figure 6:
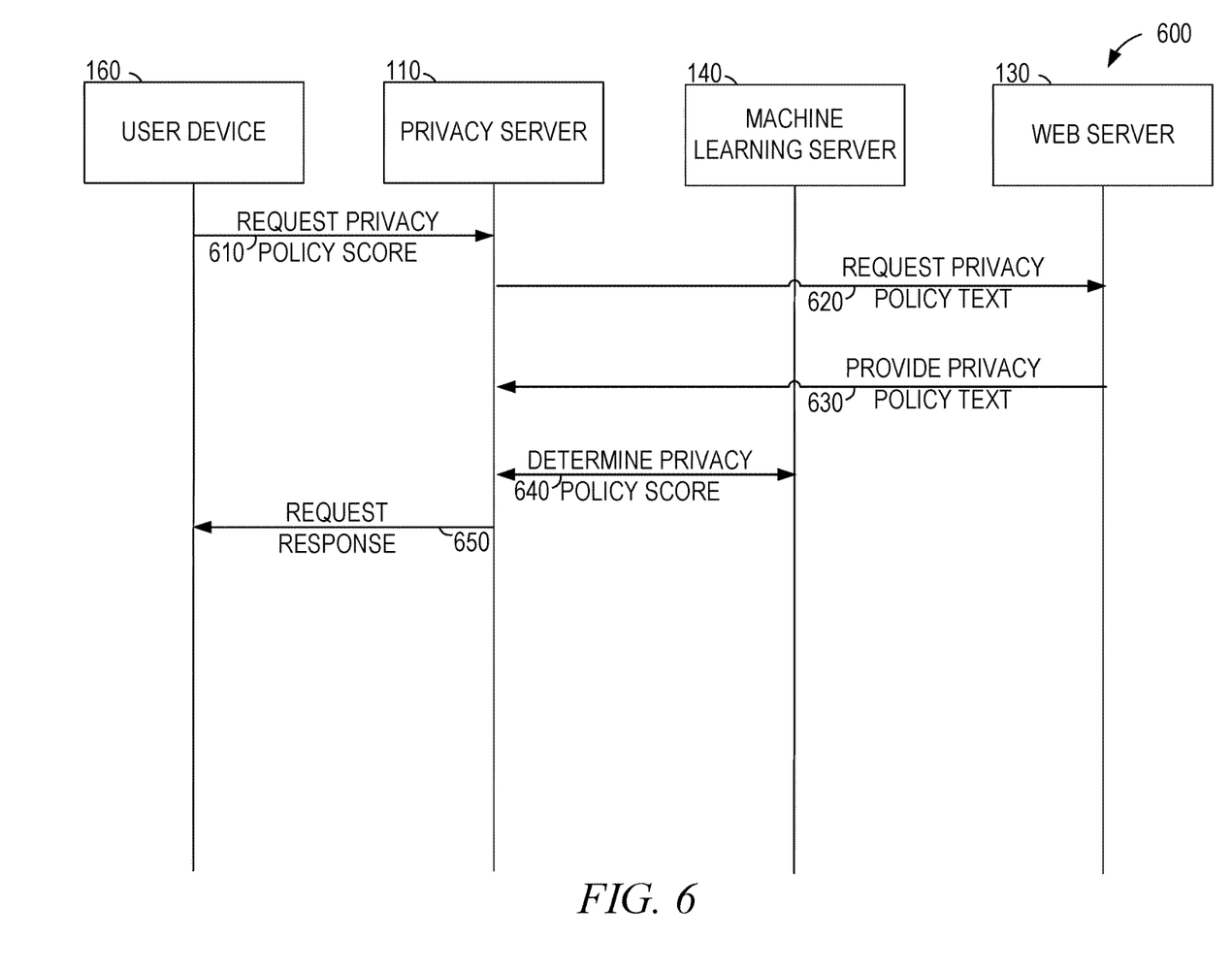
FIG. 6 is a swim-lane diagram illustrating communications between computer systems in performing a method of network privacy policy scoring, according to some example embodiments.

FIG. 6 is a swim-lane diagram 600 illustrating communications between computer systems in performing a method of network privacy policy scoring, according to some example embodiments. The swim-lane diagram 600 shows communications 610, 620, 630, 640, and 650 among the user device 160, the privacy server 110, the machine learning server 140, and the web server 130.

In communication 610, the user device 160 requests a privacy policy score from the privacy server 110. For example, a remote application programming interface (API) call may be made from the web client 170 to an application running on the privacy server 110. The API call includes an identifier of the user or the user device and the URL being accessed by the web client 170.

The privacy server 110, in communication 620, requests the privacy policy text from the web server 130. Alternatively, the text of the privacy policy may be requested from the web server 130 ahead of time for storage in the database server 120, which stores previously retrieved text. In this alternative, the privacy server 110 requests the text of the privacy policy from the database server 120 instead of from the web server 130.

In response to the communication 620, the web server 130 (or the database server 120) provides the privacy policy text in communication 630. For example, the communications 620 and 630 between the privacy server 110 and the web server 130 (or the database server 120) may be HTTP requests and responses, requests and responses using an API defined by the web server 130 (or the database server 120), or any suitable combination thereof.

In communication 630, the privacy server 110 determines a privacy policy score for the accessed URL based on data retrieved from the machine learning server 140. Though communication 630 is shown as a single two-way communication, the functionality may be implemented using multiple requests and responses. For example, the privacy server 110 may initialize a session with the machine learning server 140, receive an acknowledgement, send the privacy policy text, and receive multiple score components, each in a separate communication. Based on the received score components, the privacy server 110 determines an overall score for the privacy policy. Alternatively, the machine learning server 140 may provide the overall privacy policy score. As still another alternative, the privacy policy score may have been predetermined and stored on the database server 120. In this alternative, the privacy server 110 requests the score from the database server 120 instead of using the machine learning server 140 to determine the score.

In communication 650, the privacy server 110 provides the privacy policy score requested in communication 610. In some example embodiments, additional communications and processing are performed to generate the privacy score. The communication 650 may include an indication as to whether the privacy policy information 330 of FIG. 3 should be displayed. Alternatively, the client device 160 may determine whether to display the privacy policy information 330 based on the privacy policy score, a user configuration option, an administrator configuration option, or any suitable combination thereof.

When these effects are considered in aggregate, one or more of the methodologies described herein may obviate a need for certain efforts or resources that otherwise would be involved in determining the degree to which a web site commits to protecting privacy. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 7:
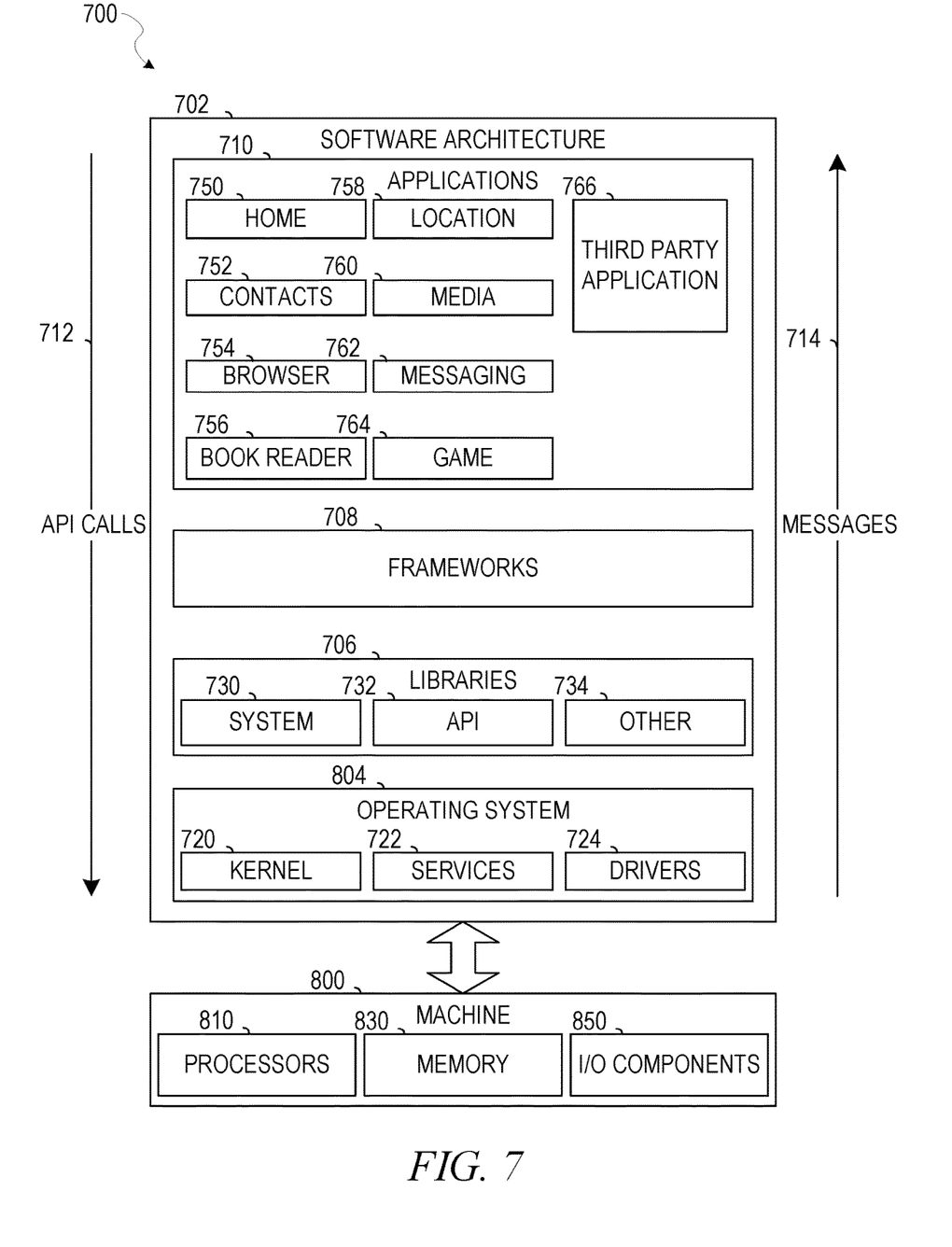
FIG. 7 is a block diagram illustrating an example of a software architecture that may be installed on a machine, according to some example embodiments.

FIG. 7 is a block diagram 700 illustrating a software architecture 702, which may be installed on any one or more of the devices described above. FIG. 7 is merely a non-limiting example of a software architecture, and it will be appreciated that many other architectures may be implemented to facilitate the functionality described herein. The software architecture 702 may be implemented by hardware such as a machine 800 of FIG. 8 that includes processors 810, memory 830, and I/O components 850. In this example, the software architecture 702 may be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, according to some implementations.

In various implementations, the operating system 704 manages hardware resources and provides common services. The operating system 704 includes, for example, a kernel 720, services 722, and drivers 724. The kernel 720 acts as an abstraction layer between the hardware and the other software layers in some implementations. For example, the kernel 720 provides memory management, processor management (e.g., scheduling), component management, networking, and security settings, among other functionality. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 706 provide a low-level common infrastructure that may be utilized by the applications 710. The libraries 706 may include system libraries 730 (e.g., C standard library) that may provide functions such as memory allocation functions, string manipulation functions, mathematic functions, and the like. In addition, the libraries 706 may include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 may also include a wide variety of other libraries 734 to provide many other APIs to the applications 710.

The frameworks 708 provide a high-level common infrastructure that may be utilized by the applications 710, according to some implementations. For example, the frameworks 708 provide various graphic user interface (GUI) functions, high-level resource management, high-level location services, and so forth. The frameworks 708 may provide a broad spectrum of other APIs that may be utilized by the applications 710, some of which may be specific to a particular operating system or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages may be employed to create one or more of the applications 710, structured in a variety of manners, such as object-orientated programming languages (e.g., Objective-C, Java, or C++) or procedural programming languages (e.g., C or assembly language). In a specific example, the third-party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 766 may invoke the API calls 712 provided by the mobile operating system (e.g., the operating system 704) to facilitate functionality described herein.

Example Machine Architecture and Machine-Readable Medium

Figure 8:
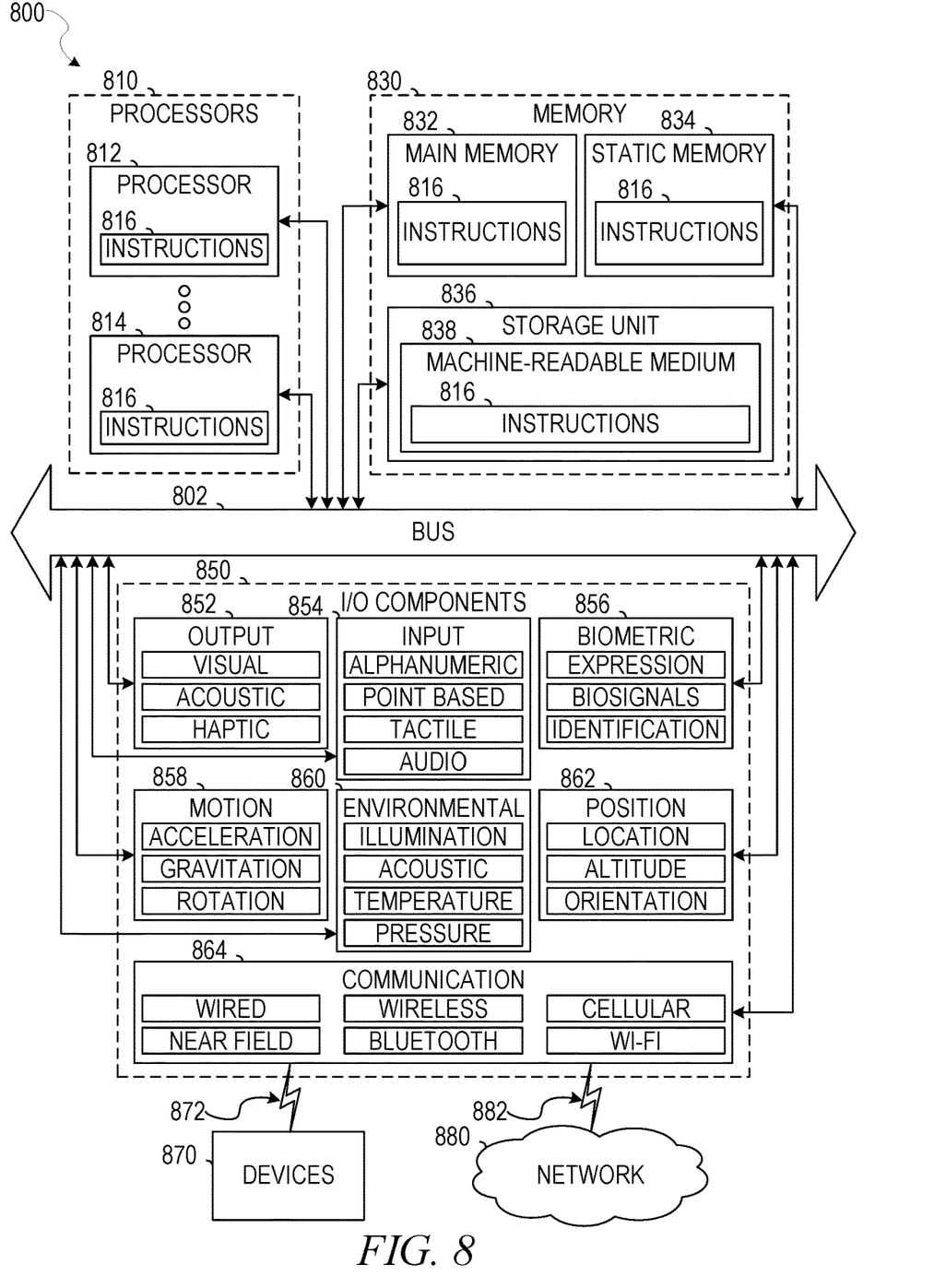
FIG. 8 is a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (also referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836 accessible to the processors 810 via the bus 802. The storage unit 836 may include a machine-readable medium 838 on which are stored the instructions 816 embodying any one or more of the methodologies or functions described herein. The instructions 816 may also reside, completely or at least partially, within the main memory 832, within the static memory 834, within at least one of the processors 810 (e.g., within the processor's cache memory), or any suitable combination thereof, during execution thereof by the machine 800.

Accordingly, in various implementations, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown in an example embodiment to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, Near Field Communication (NFC) components, Bluetooth® components (e.g., Bluetooth® Low Energy), WiFi® components, and other communication components to provide communication via other modalities. The devices 870 may be another machine or any of a wide variety of peripheral devices (e.g., a peripheral device coupled via a USB).

Moreover, in some implementations, the communication components 864 detect identifiers or include components operable to detect identifiers. For example, the communication components 864 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 as "non-transitory" should not be construed to mean that the medium is incapable of movement; the medium should be considered as being transportable from one physical location to another. Additionally, since the machine-readable medium 838 is tangible, the medium may be considered to be a machine-readable device.

Below is a non-exhaustive list of examples of implementations of the present disclosure.

Example 1 is a method comprising: receiving, by a server and from a client device, a uniform resource locator (URL) of a web site accessed by the client device; accessing, by the server, text describing a privacy policy associated with the URL; identifying, by the server, a set of phrases within the text, each phrase of the set of phrases having a corresponding score component; determining, by the server, based on the score components corresponding to the phrases of the set of phrases, a score for the privacy policy; and based on the score for the privacy policy and a comparison to a predetermined reference, causing an informational message to be presented on a display device associated with the client device.

In Example 2, the subject matter of Example 1 includes, wherein the determining of the score for the privacy policy comprises using a trained machine learning model.

In Example 3, the subject matter of Examples 1-2 includes, wherein the score components comprise a score component for data protection.

In Example 4, the subject matter of Examples 1-3 includes, wherein the score components comprise a score component for data ownership.

In Example 5, the subject matter of Examples 1-4 includes, wherein the score components comprise a score component for data use.

In Example 6, the subject matter of Examples 1-5 includes, wherein the score components comprise a score component for data disclosure.

In Example 7, the subject matter of Examples 1-6 includes, wherein the score components comprise a score component for data sale.

In Example 8, the subject matter of Examples 1-7 includes, wherein the causing of the informational message to be displayed on the display device comprises sending the score for the privacy policy to a browser plug-in running on the client device.

In Example 9, the subject matter of Examples 1-8 includes, wherein the causing of the informational message to be displayed on the display device is further based on one of the score components and a second predetermined reference.

In Example 10, the subject matter of Examples 1-9 includes, wherein the predetermined reference is a numerical value.

In Example 11, the subject matter of Examples 1-10 includes, wherein the predetermined reference is a letter grade.

Example 12 is a system comprising: a memory that stores instructions; and one or more processors configured by the instructions to perform operations comprising: receiving, from a client device, a uniform resource locator (URL) of a web site accessed by the client device; accessing text describing a privacy policy associated with the URL; identifying a set of phrases within the text, each phrase of the set of phrases having a corresponding score component; determining, based on the score components corresponding to the phrases of the set of phrases, a score for the privacy policy; and based on the score for the privacy policy and a comparison to a predetermined reference, causing an informational message to be presented on a display device associated with the client device.

In Example 13, the subject matter of Example 12 includes, wherein the determining of the score for the privacy policy comprises using a trained machine learning model.

In Example 14, the subject matter of Examples 12-13 includes, wherein the score components comprise a score component for data protection.

In Example 15, the subject matter of Examples 12-14 includes, wherein the score components comprise a score component for data ownership.

In Example 16, the subject matter of Examples 12-15 includes, wherein the score components comprise a score component for data use.

In Example 17, the subject matter of Examples 12-16 includes, wherein the score components comprise a score component for data disclosure.

Example 18 is a non-transitory machine-readable medium that stores instructions that, when executed by one or more processors, cause the one or more processors to perform operations comprising: receiving, from a client device, a uniform resource locator (URL) of a web site accessed by the client device; accessing text describing a privacy policy associated with the URL; identifying a set of phrases within the text, each phrase of the set of phrases having a corresponding score component; determining, based on the score components corresponding to the phrases of the set of phrases, a score for the privacy policy; and based on the score for the privacy policy and a comparison to a predetermined reference, causing an informational message to be presented on a display device associated with the client device.

In Example 19, the subject matter of Example 18 includes, wherein the determining of the score for the privacy policy comprises using a trained machine learning model.

In Example 20, the subject matter of Examples 18-19 includes, wherein the score components comprise a score component for data protection.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In the foregoing specification, some example implementations of the disclosure have been described. It will be evident that various modifications can be made thereto without departing from the broader scope of the disclosure as set forth in the following claims.

What is claimed is:

1. A method comprising:
receiving, by a server and from a client device, a uniform resource locator (URL) of a web site accessed by the client device;
accessing, by the server, text describing a privacy policy associated with the URL;
identifying, by the server, a set of phrases within the text, each phrase of the set of phrases having a corresponding score component;
determining, by the server, based on the score components corresponding to the phrases of the set of phrases, a score for the privacy policy, the score components comprising a score component for data protection; and
based on the score for the privacy policy and a comparison to a predetermined reference, causing an informational message to be presented on a display device associated with the client device, wherein the causing of the informational message to be displayed on the display device comprises sending the score for the privacy policy to a browser plug-in running on the client device.

2. The method of claim 1, wherein the determining of the score for the privacy policy comprises using a trained machine learning model.

3. The method of claim 1, wherein the score components comprise a score component for data ownership.

4. The method of claim 3, wherein the score component for data protection is based on an indication of General Data Protection Regulation (GDPR) compliance.

5. The method of claim 3, wherein the score component for data protection is based on an indication of rights to users to control gathered data.

6. The method of claim 1, wherein the score components comprise a score component for data disclosure.

7. The method of claim 1, wherein the score components comprise a score component for data sale.

8. The method of claim 1, wherein the causing of the informational message to be displayed on the display device is further based on one of the score components and a second predetermined reference.

9. The method of claim 1, wherein the score component for data protection is based on whether the web site stores client data in publicly accessible files.

10. The method of claim 1, wherein the score component for data protection is based on whether the web site stores client data in publicly editable files.

11. The method of claim 1, wherein the score component for data protection is based on whether client data is stored on a device with up-to-date software.

12. The method of claim 1, wherein the score component for data protection is based on whether client data is stored in a device that is not directly accessible from the public internet.

13. A system comprising:
a memory that stores instructions; and
one or more processors configured by the instructions to perform operations comprising:
receiving, from a client device, a uniform resource locator (URL) of a web site accessed by the client device;
accessing text describing a privacy policy associated with the URL;
identifying a set of phrases within the text, each phrase of the set of phrases having a corresponding score component;
determining, based on the score components corresponding to the phrases of the set of phrases, a score for the privacy policy, the score components comprising a score component for data protection; and
based on the score for the privacy policy and a comparison to a predetermined reference, causing an informational message to be presented on a display device associated with the client device.

14. The system of claim 13, wherein the determining of the score for the privacy policy comprises using a trained machine learning model.

15. The system of claim 13, wherein the score components comprise a score component for data ownership.

16. The system of claim 13, wherein the score components comprise a score component for data use.

17. The system of claim 13, wherein the score components comprise a score component for data disclosure.

18. A non-transitory machine-readable medium that stores instructions that, when executed by one or more processors, cause the one or more processors to perform operations comprising:
receiving, from a client device, a uniform resource locator (URL) of a web site accessed by the client device;
accessing text describing a privacy policy associated with the URL;
identifying a set of phrases within the text, each phrase of the set of phrases having a corresponding score component;
determining, based on the score components corresponding to the phrases of the set of phrases, a score for the privacy policy, the score components comprising a score component for data protection; and
based on the score for the privacy policy and a comparison to a predetermined reference, causing an informational message to be presented on a display device associated with the client device.

19. The non-transitory machine-readable medium of claim 18, wherein the determining of the score for the privacy policy comprises using a trained machine learning model.

* * * * *